Figure 1:
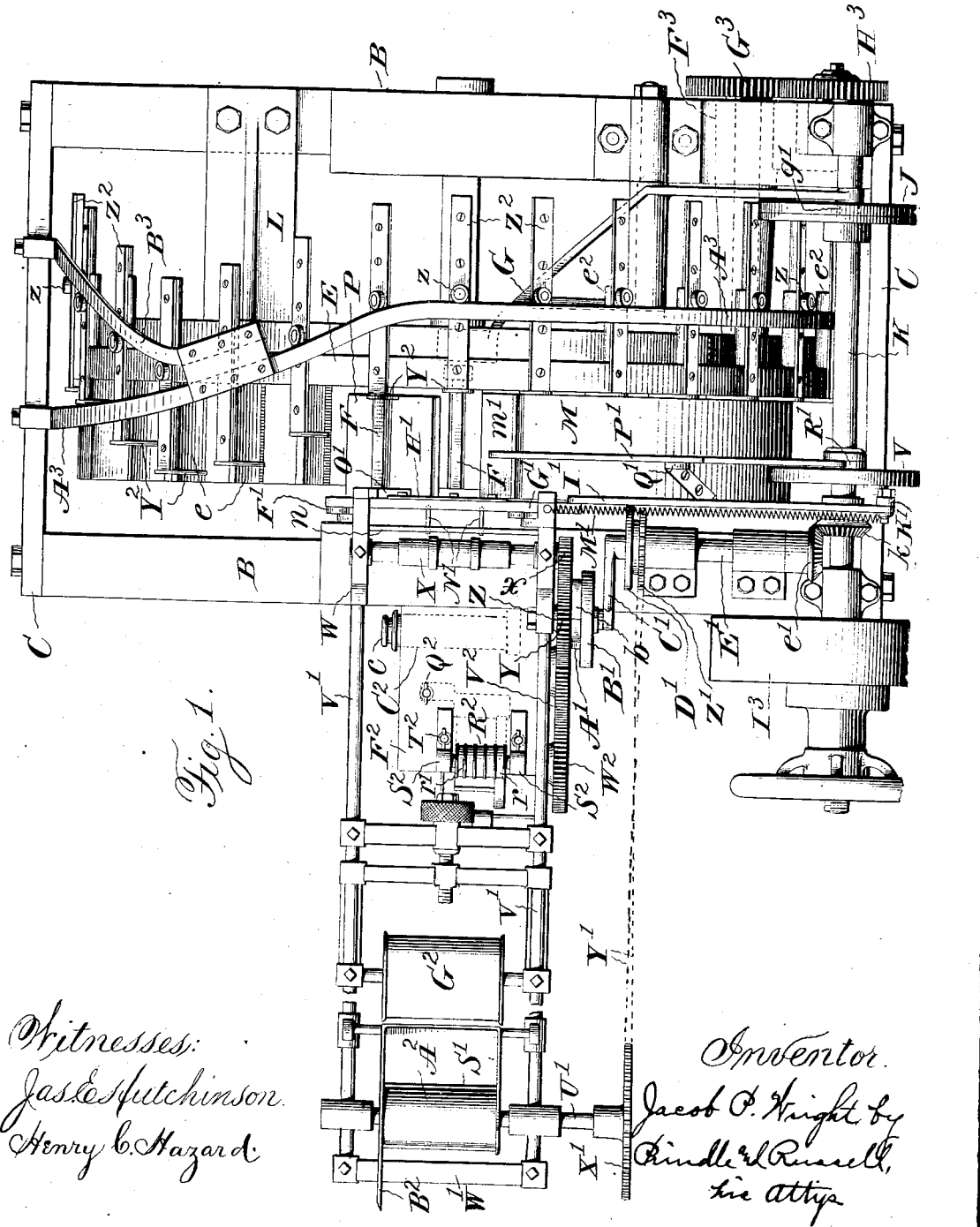

No. 813,608. PATENTED FEB. 27, 1906.
J. P. WRIGHT.
BOX MACHINE.
APPLICATION FILED JUNE 20, 1900.

9 SHEETS—SHEET 1.

Witnesses:
Jas. E. Hutchinson.
Henry C. Hazard.

Inventor.
Jacob P. Wright by
Kindle & Russell,
his attys.

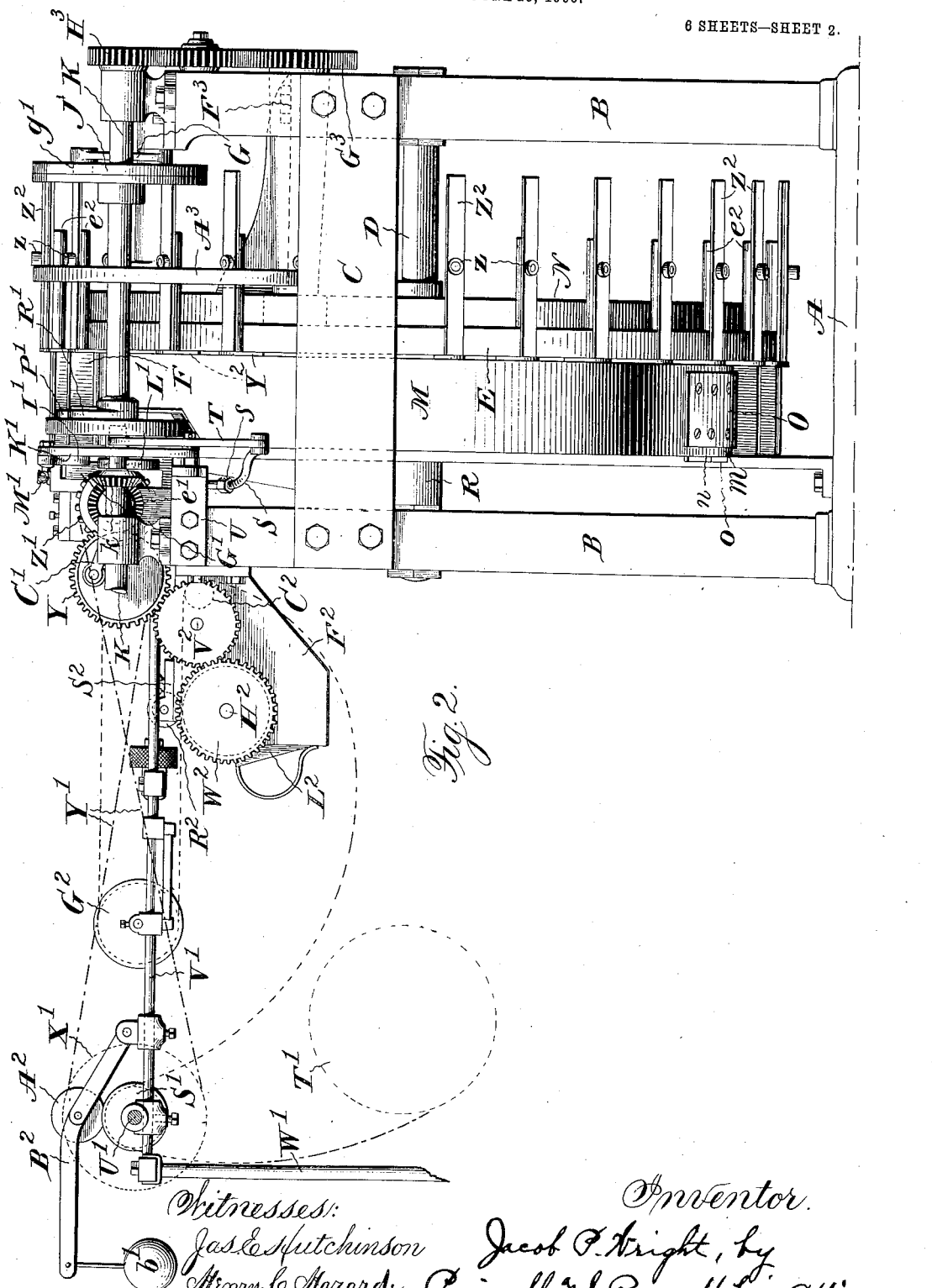

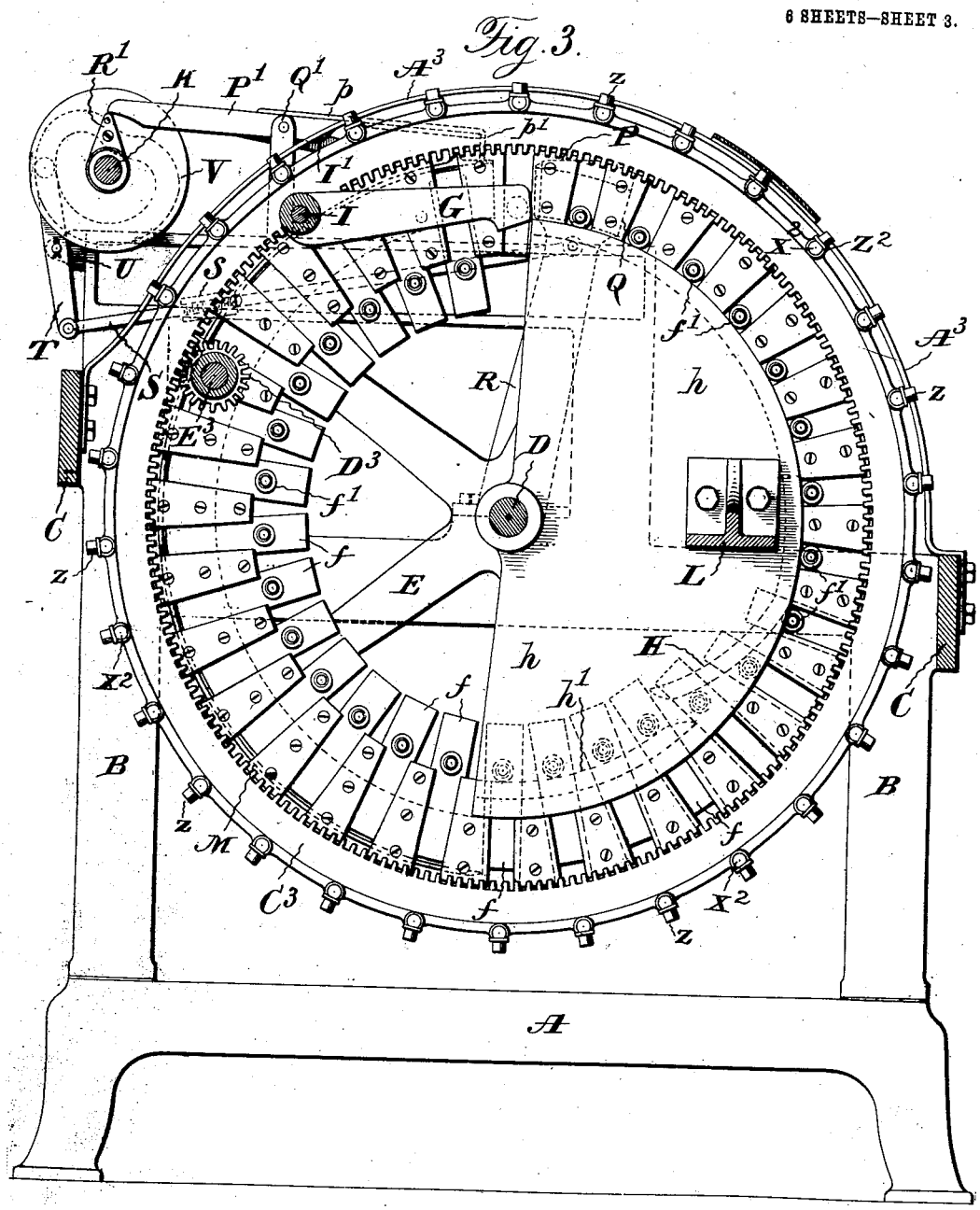

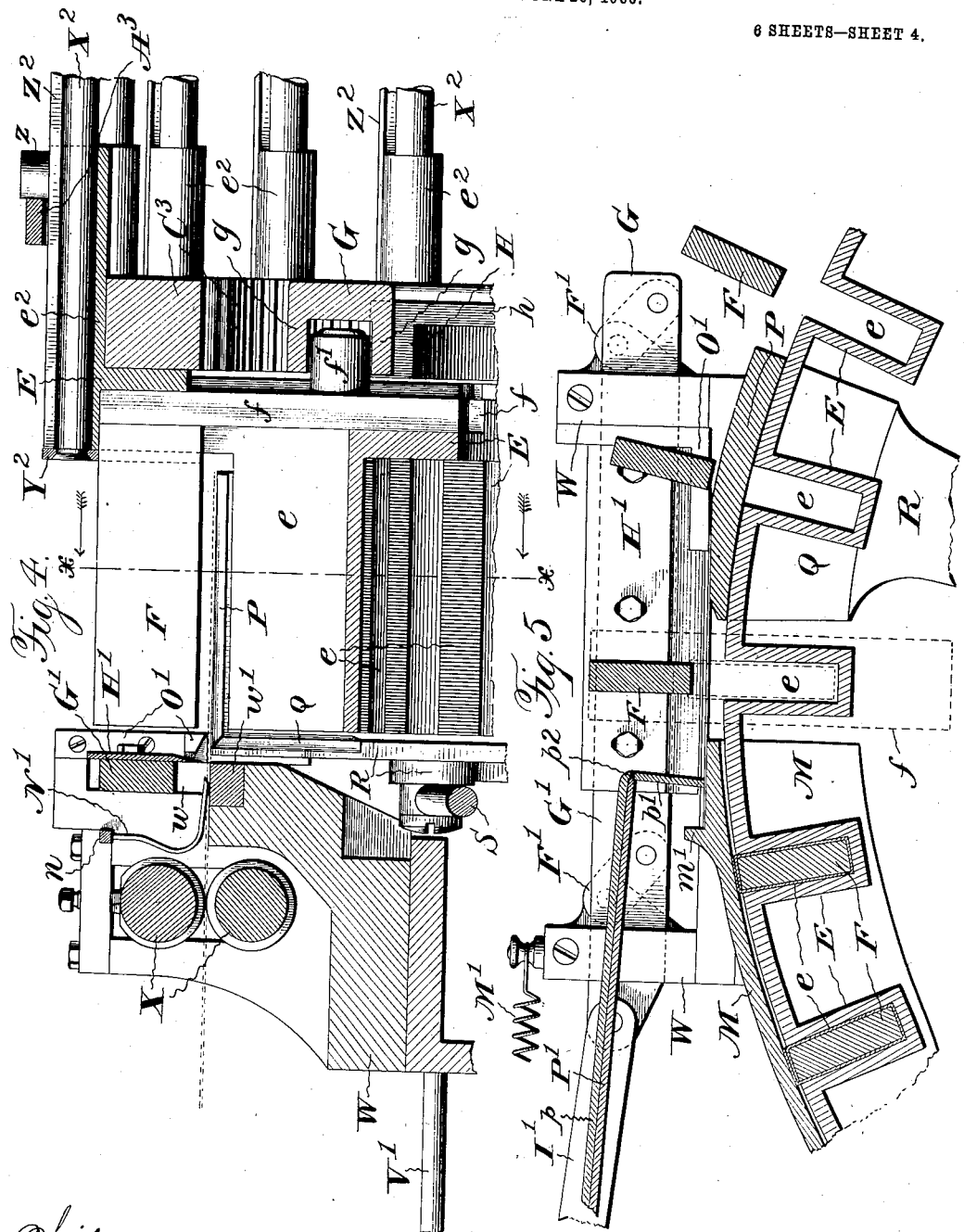

No. 813,608. PATENTED FEB. 27, 1906.
J. P. WRIGHT.
BOX MACHINE.
APPLICATION FILED JUNE 20, 1900.
6 SHEETS—SHEET 5.
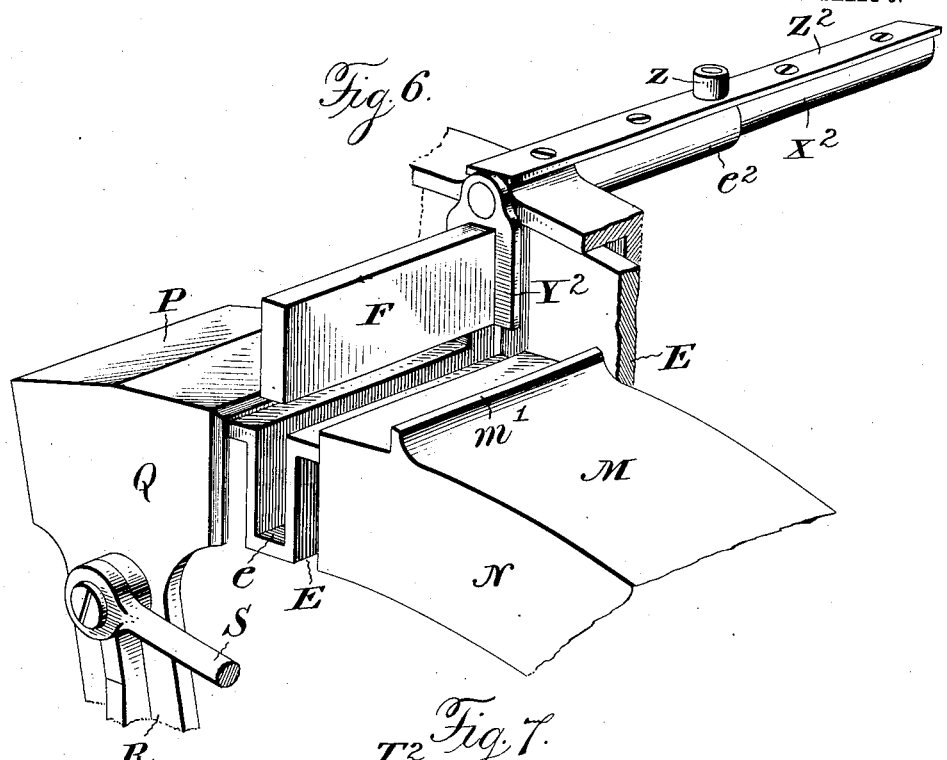
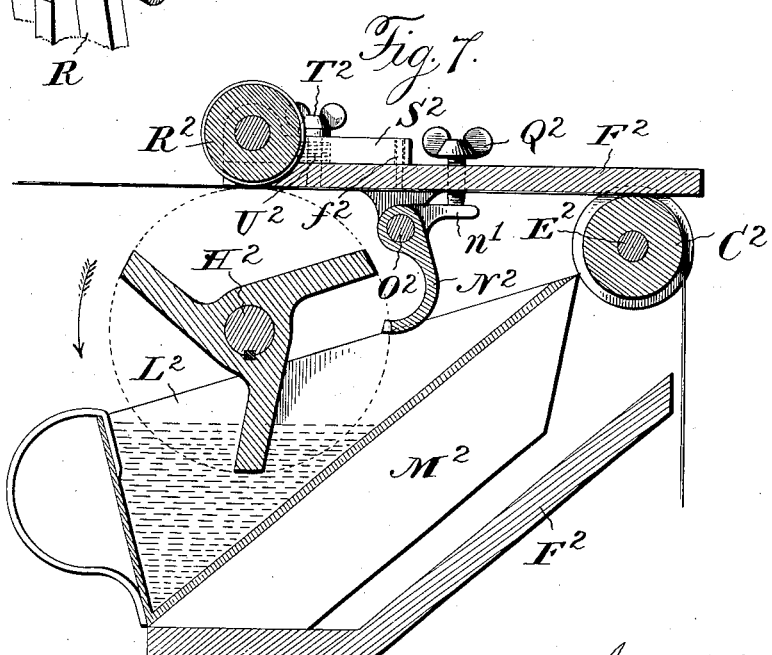
Witnesses:
Jas. E. Hutchinson.
Henry C. Hazard.
Inventor.
Jacob P. Wright, by
Prindle & Russell, his Attys.

No. 813,608. PATENTED FEB. 27, 1906.
J. P. WRIGHT.
BOX MACHINE.
APPLICATION FILED JUNE 20, 1900.
6 SHEETS—SHEET 6.
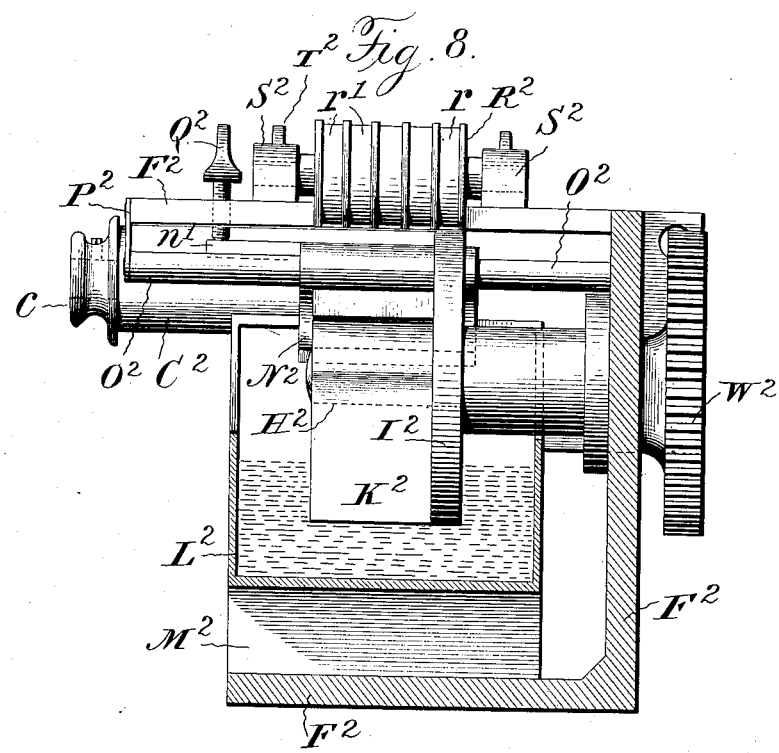
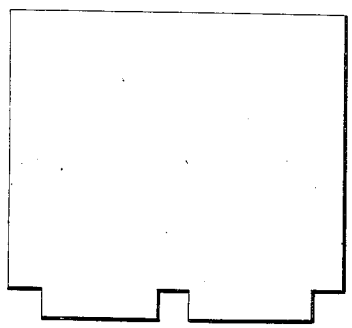
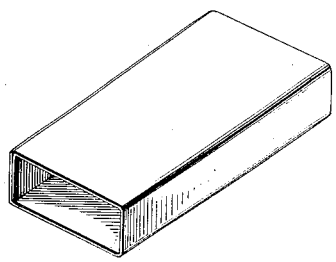
Witnesses:
Jas. E. Hutchinson
Henry C. Hazard
Inventor.
Jacob P. Wright, by
Crindle and Russell his Attys

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS, A CORPORATION OF ILLINOIS.

BOX-MACHINE.

No. 813,608.  Specification of Letters Patent.  Patented Feb. 27, 1906.

Application filed June 20, 1900. Serial No. 20,970.

*To all whom it may concern:*

Be it known that I, JACOB P. WRIGHT, of New Haven, in the county of New Haven, and in the State of Connecticut, have invented certain new and useful Improvements in Box-Machines; and I do hereby declare that the following is a full, clear, and exact description thereof, reference being had to the accompanying drawings, in which—

Figure 1 is a top plan view of a box-machine embodying my invention; Fig. 2, an end elevation of said machine; Fig. 3, a transverse vertical section thereof; Fig. 4, a detail view in vertical longitudinal section; Fig. 5, a detail view in section on the line $x\ x$ of Fig. 4; Fig. 6, a detail view in perspective of the folding mechanism; Fig. 7, a detail view, in vertical section, of the gluing mechanism; Fig. 8, a detail view thereof in transverse section, and Figs. 9 and 10 are respectively detail views of a box-blank and a finished box.

Letters of like name and kind refer to like parts in each of the figures.

The object of my invention is to provide a machine for making box parts having the form of a flat-sided tube with one end closed; and to this end said invention consists in the machine and in the parts thereof constructed substantially as hereinafter specified.

The particular kind of box part which my machine is designed to make is shown in Fig. 10 and consists of a comparatively long flat-sided tube with one end closed and the other open, a blank such as is shown in Fig. 9 being used in its manufacture, which consists of a rectangular piece of sheet material, preferably heavy paper, notched along one edge at each end and at mid-length thereof to provide two side and two end folds to form, respectively, one of the narrow sides of the box and the closed end thereof. The stock from which the blanks are supplied is in the form of a strip punched at regular intervals and wound into a roll, from which it is drawn past a gluing mechanism for the application of glue to one of each pair of laps or folds and its free end finally delivered to the cutting and folding mechanisms, enough of the strip to form a blank being presented in position for the action of the folding mechanism and then cut off.

In the machine illustrated there is employed a base A, upon which is mounted a frame composed of two similar vertical sides B and B, that at both ends are united by cross-bars C and C, respectively. Journaled in bearings on the frame sides is a horizontal shaft D, upon which in the space between said sides is fixed a wheel or drum E, having a large number of similar radially-extending slots or cavities $e$ and $e$, that extend to the circumference of the wheel and have each three flat sides or walls. For each of the slots or cavities $e$ and $e$ there is carried by the wheel a bar F, that is four-sided in cross-section and constitutes a former or mandrel for the box. Said former or mandrel is attached at one end to the outer portion of a slide-bar $f$, that is placed in a radially-extending guideway on one side of the wheel E and has on its outer side a roller $f'$, which is adapted to be engaged by a lever G and the slide-bar moved to carry the former into its slot $e$ and by a fixed cam-rib H as the wheel revolves to move the former out of its slot $e$. The lever G is pivoted on a shaft I, which is secured at the top of one of the frame sides B and has its roller-engaging end forked or provided with a pair of laterally-projecting lugs $g$ and $g$ to engage the roller above and below, while its other end has a roller $g'$, that engages a cam J upon a driving-shaft K, journaled in bearings on the tops of the frame sides B and B. The cam-rib H projects laterally from a semicircular plate or segment $h$, that is supported by the shaft D, it having an opening through which the shaft passes, and by a bracket L bolted to it and to one of the frame sides B. In addition to the cam-rib H the plate $h$ has a rib $h'$, that is curved in an arc concentric with the shaft D and above which the rollers travel before encountering the cam-rib H.

Concentric with the wheel E are two plates M and N, that are substantially semicircular and lie, respectively, close to the circumference of the wheel and the side thereof opposite that on which are the former-carrying slides $f$ and $f$. They extend from a point adjacent to the place where the formers F and F are moved into their respective cavities $e$ and $e$ to the end of the rib $h'$ that is farthest from the cam-rib H. A former F when moved into its cavity folds therein a blank, so as to leave two side edges projecting above the periphery of the wheel E and two end edges projecting from the side thereof over which the plate N lies. The one of each of such two edges farther from the plates M and N by means to be described is folded down upon the former, and the other two by the travel of the wheel are brought against and are folded down by the end edges of said plates and are carried along under the same, the space between said plate and the adjacent surfaces of the wheel being just sufficient to accommodate the two thicknesses of the paper. The extremities of the two plates M and N where the folded box emerges are formed of pieces $m$ and $n$, respectively, that are pressed yieldingly inward by springs O and O, which are each attached at one end to a plate and at the other end to the piece that forms the extremity thereof.

For folding down the two edges of the blank before the latter reaches the plates M and N there is employed a folder that comprises two plates P and Q, which, like the fixed folder-plates M and N, extend, respectively, over the circumference and one side of the wheel E and are movable to and fro, being for this purpose mounted upon a swinging arm R, that is pivoted upon the shaft D. The arm is vibrated by being connected, by means of a link or pitman S, with a lever T, that is pivoted to a bracket U on the adjacent frame side and receives motion from a cam V upon the driving-shaft K. The link or pitman S is made adjustable by the familiar expedient of forming it of two parts with reversely-threaded ends connected by a turnbuckle $s$.

A portion of the upper side of each of the plates M and P is flattened, so that the two when the plate P is retracted are in the same horizontal plane and form a rest or table upon which the blank at opposite sides is supported beneath a former F while being cut off from the strip of the stock and until the descent of the said former. At the outer side of the flat portion of the plate M there is a flange or ledge $m'$, against which one edge of the paper lies.

On the top of the frame side B adjacent the wheel E is secured a frame or housing W in boxes or bearings, on which are journaled a pair of stock-feeding rolls X and X, placed one above the other. Said rolls are geared to rotate together by intermeshing gears $x$ and $x$, one of which is in mesh with a gear Y, journaled on a stud-shaft Z, fastened to the housing W at one end. Attached to the gear Y is a ratchet-wheel A', and alongside the latter on the shaft Z is a disk B', carrying a pawl $b$, that engages and turns the ratchet-wheel. The pawl-carrying disk B' is oscillated by being connected by a pitman C' with a crank-disk D' upon a short shaft E', which is journaled in boxes upon the upper side of the near frame side B and has at one end a bevel-pinion $e'$, which meshes with a like pinion $k$ on the driving-shaft K, and thus receives motion from the latter that is transmitted by the mechanism described to the feed-rolls X and X and imparting to them an intermittent movement.

Pivoted to a pair of links F' and F', that are respectively pivotally attached to the housing W at opposite ends thereof, is a horizontal bar G', to the side of which is attached a straight cutter or knife H' and which passes through guide-slots $w$ and $w$ at opposite ends of the housing. The bar G' is connected by a link or pitman I' to a lever K', which is pivoted to the bracket U alongside of the folder-operating lever T and which is moved in one direction by a cam L' on the driving-shaft K and in the opposite direction by a coiled spring M', one end of which is attached to the lever and the other end to the housing W. The movement of the lever by the cam causes the endwise and downward movement of the knife past the edge of a cutting-bar $w'$ on the housing, while the reverse movement of the knife is produced by the spring M'. It will be seen that the cutting action of the knife is a drawing one.

The paper in passing from the feed-rolls to the knife moves beneath a pair of spring-fingers N' and N', that depend from a cross-bar $n$, secured to the housing W, and on the opposite side of the knife it passes beneath an arm O', which projects from the housing W and is thereby held down in place.

The paper while being cut and until engaged by the former that moves the blank into its slot $e$ is firmly held against accidental displacement by a holding device that presses it against the flat table-like surface on the fixed folder-plate M. Said device comprises an arm or lever P', that is pivoted intermediate its ends to an upright Q', fastened to the plate M, and at one end is constructed to engage the paper and at its other end to coöperate with a cam R', carried by the driving-shaft K. Between the pivot of the lever and the paper-engaging end the lever is slender, and fastened at one end to the upper side of the lever and extending along such slender portion is a light bar $p$, that has a right-angled extension or finger $p'$, whose free end is the paper-engaging part of the lever, and between which and the main part of the lever is a loose connection, formed by a round stud $p^2$ on the main part of the lever, and an opening in the finger $p'$, into which the stud enters. Were the paper-engaging finger $p'$ rigidly fastened to the lever, any bending or buckling of the latter between its pivot and the paper-engaging end under pressure applied to hold the paper would result in movement of the finger and consequent displacement of the blank, whereas with the construction shown bending or buckling of the main or body part of the lever will not have such an effect, as by reason of the loose connection between it and the finger $p'$ it can move without moving said finger.

Besides the feed-rolls X and X there is a feed-roll S', to which the paper passes from the roll of stock T' and which is mounted on a shaft U', that is journaled in bearings on a pair of parallel rods V' and V', that extend horizontally from the housing W and are supported by a stand W' at their ends which are away from the housing. Upon the shaft U' is a sprocket-wheel X', that is connected by a crossed sprocket-chain Y' with a sprocket-wheel Z' on the shaft E', and thus power transmitted from the latter to the roll. The paper is passed to and over the top of the latter, and to press it against said roll there is a roll $A^2$, that is mounted on an arm $B^2$, that is pivoted to a bracket upon one of the rods V' and to which is attached a weight $b'$ for applying the desired pressure upon the paper.

From the roll S' the paper is carried to and over an idler-roll $C^2$ upon a shaft $D^2$, mounted on a stud-shaft $E^2$, secured to a bracket $F^2$, that is bolted to one of the frame sides B, and then, passing a gluer mechanism presently described, is carried to and around a tension-roll $G^2$ and thence to the feed-rolls X and X. The shaft $E^2$ is supported only at one end, so as to leave an end of the roll $C^2$ free to enable the paper to be placed thereon sidewise instead of by the far more inconvenient method of drawing it endwise, as would be necessary were the shaft supported at both ends. On the unsupported end of the shaft adjacent the roll $C^2$ is a collar $c$ of greater diameter than the roll and being removably secured to the shaft.

The bracket $F^2$ has a top, bottom, and one side, and on the latter is a bearing for a shaft $H^2$, on which is a glue-wheel that comprises an annular portion $I^2$ and several equidistant portions $K^2$ and $K^2$, having the same radius as the other and extending parallel with the wheel-axis, being the outer or peripheral faces of arms that extend from the wheel-hub outward in directions that incline from lines radial to the wheel, the inclination being rearward and outward with reference to the direction of rotation of the wheel. The lower portion of the glue-wheel is in a glue-pot $L^2$, which rests upon a heater $M^2$, secured to the bracket-bottom. Just above the glue-pot the glue-wheel is engaged by a scraper $N^2$, that removes surplus glue therefrom, which scraper has the form of a curved plate slightly wider than the glue-wheel, with its wheel-engaging edge cut away or notched, so that at each end it projects alongside of the wheel. Said scraper is hung from a rod $O^2$, that at one end is fastened to the one side wall of the bracket $F^2$ and is supported at its other end by a plate $P^2$, depending from the top of the bracket and attached thereto, so as to permit ready separation from the rod when occasion therefor may be necessary. The scraper is pivoted on its supporting-rod, and it has a lug or projection $n'$, that is engaged by a set-screw $Q^2$, tapped through the top of the bracket and by which it may be adjusted relative to the glue-wheel to effect the removal therefrom of all but the proper quantity of glue. The above-described inclination of the glue-wheel arms which carry the glue-applying portions $K^2$ and $K^2$ prevents such arms lifting glue as they emerge from the pot, because the angle at which the forward sides of said arms stand on emerging from the pot is such that glue readily passes off the same.

Above the glue-wheel is a roller $R^2$, between which and the glue-wheel the paper passes. To reduce the paper-engaging surface of the roller $R^2$ as much as possible, it is grooved circumferentially, a single groove $r$ being provided opposite the annular portion $I^2$, so that there is only a narrow bearing-surface on the roller opposite each edge of said portion $I^2$, and numerous grooves $r'$ and $r'$ being provided opposite the glue-carrying portions $K^2$ and $K^2$, so that opposite the latter there is a series of narrow bearing-surfaces. As a result of the provision of the circumferential grooves in the roller, as described, there is no pressure applied to a larger proportion of the surface of the paper opposite the glue, and hence any such squeezing action on the glue is avoided, as would result in the exudation of the glue at each side of the roller and the formation thereat on the paper of raised lines or ridges of glue.

The roller $R^2$ is journaled in bearings in two brackets $S^2$ and $S^2$ upon the top of the bracket $F^2$, that are secured to the latter, preferably by means which permit the ready lifting of the roller for the convenient insertion of paper between it and the glue-wheel when such insertion is necessary. As shown, each bracket $S^2$ is held by a thumb-screw $T^2$, which enters a tapped opening in the top of the bracket $F^2$ and a pin or stud $f^2$ on the latter that enters an opening in the bracket. To facilitate the operation of inserting the paper, a coiled spring $U^2$ is placed in a recess in the under side of each bracket $S^2$, that lifts the same and the roller when the thumb-screws are raised.

The glue-wheel is revolved by power taken from the feed-roll-driving gear Y, with which latter meshes a gear-wheel $V^2$, journaled on a stud on the side of the bracket $F^2$, that meshes with and drives a gear-wheel $W^2$ on the glue-wheel shaft $H^2$.

Carried by the wheel E on the circumference of an annular flange $e$ on the wheel is a series of guides $e^2$ and $e^2$, which are parallel with the wheel-axis and contain each a sliding rod $X^2$, that at one end has a plate $Y^2$, that projects inwardly at a right angle therefrom and is slotted to permit it to straddle one of the formers F and F, there being one of such devices for each former. The rod X² is circular in cross-section with one side flatted, the magnitude of the arc left by the flatting being greater than a half-circle, and the guide e² therefor is of similar formation, so that portions thereof on opposite sides overhang the sides of the rod, and the latter is thus confined. Secured to the flat side of the rod and projecting over flat sides of the guide is a thin bar Z², and upon the outer side of the latter is a roller z. In the path of the roller as the wheel E revolves there is an inclined track or cam-bar A³, which moves the rod in the direction to carry its plate Y² along the former outward and move the box off the former, while for returning the plate to position at the inner end of the former there is another inclined track or cam-bar B³ with which the roller engages on the opposite side.

For revolving the wheel E it has an internally-toothed gear C³, with which meshes a pinion D³ upon one end of a shaft E³, journaled in a bracket F³, bolted to one of the frame sides B, and upon the other end of which is a gear-wheel G³, that through an intermediate gear journaled on a stud-shaft on said frame side B is driven from a pinion H³ on the driving-shaft K. By the employment of the internally-toothed gear the power for driving the wheel E is most advantageously applied and results in the avoidance of such strains as might interfere with the production of perfect boxes. For revolving the drive-shaft K there is shown a band-wheel I³.

The operation of my machine is as follows: A roll of paper being provided and power applied to the driving-shaft K, the wheel E will be continuously revolved and the paper-feeding rolls intermittently revolved, the latter at each movement projecting over the wheel E upon the flat portions of the plates M and P enough paper to form a blank, which by the gluing mechanism has been supplied with glue along one side edge and one end edge. The feeding movement of the rolls ceasing, the end portion of paper to form a blank is cut off, and by the time such is done a former F and its slot are respectively above and below the blank, and said former, by the action of the lever G, is moved downward, carrying the blank with it into its slot, with its two side edges projecting above the former and the periphery of the wheel and two end edges projecting beyond the end of the former and the side of the wheel. The side and end edges nearer the movable folder-plates P and Q are next engaged by the latter and folded down upon the former, which having been done the other two edges, which are the ones having the glue, are by the continued movement of the wheel brought against the plates M and N and are turned down upon and made to adhere to the two edges or laps previously folded down. The box part is now completely formed upon the former; but it is desirable to confine the laps or folds long enough for the glue to set, and this object is attained by the extent of travel of the box part under the plates M and N. In passing from the latter the folds or laps are given a final pressure to insure the perfect contact and gluing of the laps together by the spring-pressed pieces m and n. Leaving the latter, the former with the box is retained in the wheel-slot by the rib h', above which the slide-roller g passes, until the roller encounters the cam-rib H and former and box are thereby pushed out of the wheel-slot. This having been effected, the roller z of the box-ejecting device encounters the cam-bar A³, and the ejector-plate Y² is moved outward along the former, carrying with it the box, which is finally removed. The continued movement of the wheel brings the roller z against the other cam-bar B³ and the ejector-plate is moved to the inner end of the former, leaving the same in readiness for making another box. The former is kept in its position out of its slot until it is to be moved by the lever G by the engagement of its slide-roller f' with a circular portion of the cam-rib H, which is concentric with the wheel. On passing from said rib H into position for engagement by the lever G the former is prevented from accidentally dropping by the lower one of the two lever-lugs g and g being in the path of the slide-roller f'.

It is to be understood that though in the above description of the operation of the machine the work of making but a single box has been set forth other boxes are at the same time in the various stages of manufacture, so that a large number of boxes are simultaneously in course of production.

Though preferring to embody my invention in a machine such as that herein shown and described, it is to be understood that such invention is susceptible of embodiment in machines whose parts will vary in construction and arrangement from those of the one herein set forth.

Having thus described my invention, what I claim is—

1. In a box-machine, the combination of a movable part, having a series of cavities, a series of formers movable into and out of such cavities, a movable device mounted exteriorly of and adjacent to said movable part and adapted to be successively engaged by the formers, and means for periodically actuating said device to effect the movement thereby of said formers into the cavities, substantially as and for the purpose described.

2. In a box-machine, the combination of a movable part, having a series of cavities, a series of formers mounted upon and traveling with such part, and movable into and out of such cavities and a lever for moving said formers into the cavities, substantially as and for the purpose described.

3. In a box-machine, the combination of a rotary part, having a series of cavities, a series of formers movable into and out of such cavities, a movable device mounted exteriorly of and adjacent to said movable part and adapted to be successively engaged by the formers, and means for periodically actuating said device to effect the movement thereby of said formers into the cavities, substantially as and for the purpose described.

4. In a box-machine, the combination of a rotary part having a series of radially-extending cavities that open to the peripheries of the part, a series of formers movable into and out of the cavities, and a single lever for the series of formers for moving the same into the cavities.

5. In a box-machine, the combination of a movable part having a series of cavities, a series of formers movable into and out of such cavities, moving means to act on the formers to move them into the cavities, and a cam to act on the formers to move them out of the cavities, substantially as and for the purpose described.

6. In a box-machine adapted to operate on blanks having flaps to form two side folds and flaps to form but two end folds, the combination of a former, a traveling part having a cavity into and out of which the former is movable, means for moving the former into the cavity to fold the blank with all of said flaps projecting, means for folding one of each of the two flaps, and a stationary lap-folder for folding the remaining flaps beneath which said traveling part carries the partially-folded blank.

7. In a box-machine, the combination of means to form blanks, having two flaps to form side folds and but two flaps to form end folds, a former, a traveling part having a cavity into and out of which the former is movable, means for moving the former into the cavity to fold the blank with all of said flaps projecting, means for folding one of each of the two flaps, and a stationary lap-folder for folding the remaining flaps beneath which said traveling part carries the partially-folded blank.

8. In a box-machine adapted to operate on blanks having flaps to form two side folds and flaps to form but two end folds, the combination of a traveling part having a series of cavities, a series of formers movable into and out of such cavities, means for moving a former into its cavities to form three sides of the box, means for folding one of each of the two flaps, and a stationary lap-folder for folding the remaining two flaps.

9. In a box-machine, the combination of a wheel having a series of peripheral cavities, a series of formers movable into and out of such cavities, a fixed lap-folder comprising two plates, one extending adjacent to the circumference of the wheel, and the other adjacent the side thereof, and a movable lap-folder having parts corresponding to said plates, substantially as and for the purpose described.

10. In a box-machine, the combination of a wheel having a series of peripheral cavities, a series of formers mounted on the wheel and movable in radial lines into and out of said cavities, a lap-folder carried by an arm that is pivoted concentric with the wheel-axis, and a fixed folder-plate concentric with the wheel, substantially as and for the purpose described.

11. In a box-machine, the combination of a wheel having a series of peripheral cavities, a series of formers consisting of bars that extend parallel with the wheel-axis, slide-bars to which the formers are attached, mounted in guides on the wheel, and a lever for moving the slide-bars to carry the formers into their cavities, to which the slide-bars are moved in succession.

12. In a box-machine, the combination of a wheel having a series of peripheral cavities, a series of formers consisting of bars that extend parallel with the wheel-axis, slide-bars to which the formers are attached, mounted in guides on the wheel, a lever for moving the slide-bars in one direction, and a cam for moving them in the opposite direction, substantially as and for the purpose described.

13. In a box-machine, the combination of a wheel having a series of peripheral cavities, a series of formers consisting of bars that extend parallel with the wheel-axis, slide-bars to which the formers are attached, mounted in guides on the wheel, a lever for moving the slide-bars to carry the formers into their cavities, a cam for moving them in the opposite direction, and a curved plate concentric with and adjacent to the wheel-periphery, substantially as and for the purpose described.

14. In a box-machine, the combination of a wheel having a series of peripheral cavities, a series of formers consisting of bars that extend parallel with the wheel-axis, slide-bars to which the formers are attached, mounted in guides on the wheel, a lever for moving the slide-bars to carry the formers into their cavities, a cam for moving them outward, a lap-folder consisting of a curved plate concentric with and adjacent to the wheel-periphery, and a lap-folder consisting of a swinging plate, substantially as and for the purpose described.

15. In a box-machine, the combination of a wheel having a series of peripheral cavities, a series of formers consisting of bars that extend parallel with the wheel-axis, slide-bars to which the formers are attached, mounted in guides on the wheel, a lever for moving the slide-bars to carry the formers into their cavities, a cam for moving them outward, and lap-folders consisting, respectively, of movable and fixed plates, substantially as and for the purpose described.

16. In a box-machine, the combination of a wheel having a series of peripheral cavities, a series of formers consisting of bars, moving means for moving the bars into the cavities, means for moving said bars out of the cavities, lap-folders consisting respectively, of movable and fixed plates, and means for removing the boxes from the formers, substantially as and for the purpose described.

17. In a box-machine, the combination of a wheel having a series of peripheral cavities, a series of formers consisting of bars, means for moving the bars into and out of the cavities, lap-folders, and box-removing means comprising sliding rods guides for the rods on the wheel, box-engaging plates carried by the rods, and means for sliding the rods, substantially as and for the purpose described.

18. In a box-machine, the combination of box-forming devices comprising a series of cavities and corresponding bars that are movable into and out of the cavities, means for continuously moving the same, means for feeding stock to said box-forming devices, means for cutting a box-blank from the stock and means for so operating the cutting means with reference to the travel of the box-forming devices as to free the blank for the action of a forming device when it is in position to act on the blank, whereby movement of the cutting means along with the box-forming devices is avoided, substantially as and for the purpose described.

19. In a box-machine, the combination of box-forming devices, comprising a wheel having a series of cavities and corresponding bars movable into and out of the cavities, means for continuously revolving the wheel, means for feeding stock to the box-forming devices, means for cutting a box-blank from the stock, and means for so operating the cutting means with reference to the travel of the wheel as to free the blank for the action of a forming device when it reaches the blank, whereby movement of the cutting means along with the wheel is avoided, substantially as and for the purpose described.

20. In a box-machine, the combination of strip-feeding rolls, means for intermittently rotating them a knife mounted on a stationary support, box-forming devices comprising a wheel having a series of cavities and corresponding bars that are movable into and out of the cavities, and means for continuously revolving the wheel, substantially as and for the purpose described.

21. In a box-machine, the combination of a box-forming device comprising a traveling part having a cavity and a bar movable into and out of the cavity, and stationary and movable lap-folders, having surfaces on which the box-blank is supported preliminary to the action of the box-forming device, substantially as and for the purpose described.

22. In a box-machine, the combination of a wheel having a series of cavities, corresponding bars, movable into and out of the cavities, a stationary lap-folder overlying the wheel-circumference, and a movable lap-folder overlying the wheel-circumference, each of said lap-folders having a blank-supporting portion, substantially as and for the purpose described.

23. In a box-machine, the combination of strip-feeding rolls, means for intermittently rotating them, a wheel having a series of cavities and corresponding bars that are movable into and out of the cavities, movable and fixed lap-folding plates, having portions upon which the portion of strip to form a blank is supported, and a knife for cutting such strip, substantially as and for the purpose described.

24. In a box-machine, the combination of folding mechanism, a blank-support, and a blank-holder, comprising a presser-bar yieldingly connected with a blank-engaging part of the holder, substantially as and for the purpose described.

25. In a box-machine, the combination of folding mechanism, a blank-support, and a blank-holder comprising a lever, a bar thereon having a blank-engaging finger, and a connection between said bar and lever that permits buckling of the lever without displacing said finger, substantially as and for the purpose described.

26. In a box-machine, the combination of folding mechanism, a blank-support, and a blank-holder comprising a lever having a blank-engaging finger carried by a bar that has a loose connection with the finger.

27. In a box-machine, the combination of blank-folding means a glue-wheel, and a support for box-stock opposite the glue-wheel, the stock-engaging surfaces of the support being of less area than the area of the glue-applying surfaces, substantially as and for the purpose described.

In testimony that I claim the foregoing I have hereunto set my hand this 28th day of May, 1900.

JACOB P. WRIGHT.

Witnesses:
V. C. Ross,
J. A. Baughman.